3,017,290
MODIFIED PAPERS AND METHODS FOR PREPARING THEM

Isadore Rosenthal, Levittown, Pa., and Paul J. McLaughlin, Moorestown, N.J., assignors to Rohm & Haas Company, Philadelphia, Pa., a corporation of Delaware
No Drawing. Filed Dec. 12, 1957, Ser. No. 702,251
20 Claims. (Cl. 117—106)

The present invention relates to the treatment of paper for the purpose of sizing it, reducing its ease of penetrability by water, increasing its durability, improving its dimensional stability, or rendering it more water-repellent. The invention is also concerned with the protection of coatings, printings, or other indicia on paper or paperboard bases. It is concerned with the modified products as well as with the process of modifying them for any of the purposes described hereinabove.

In accordance with the present invention, it has been discovered that modified papers having improved properties of the character mentioned hereinabove can be obtained by the in situ polymerization of one or more esters of α-cyanoacrylic acid having the formula $$CH_2=C(CN)COOR$$

where R is an alkyl group having 1 to 4 carbon atoms.

In general, the process of the present invention comprises the following step:

Air-dry paper containing small amount of moisture is subjected to vapor of a ($C_1$-$C_4$)-alkyl α-cyanoacrylate for at least about 15 seconds.

This in situ polymerization can be effected merely by supporting the paper or paperboard base in vapors of one or more of the esters. The paper or paperboard supported in such vapors should be air-dry, by which is meant that it contains at least a trace of moisture absorbed in its surfaces as a result of the normal contact with ambient air which may have normal room temperatures between about 150° C. and 30° C. or so and a relative humidity between about 30% and 100%, preferably between about 55% and 75%.

The monomers in accordance with the present invention are provided by depolymerization of commercially-available polymerization products such as those obtainable by heating formaldehyde and one or more of the α-cyanoacetate esters at a temperature of about 50° to 90° C. in the presence of a basic catalyst such as the inorganic bases such as sodium or potassium hydroxide, ammonia or ammonium hydroxide, the organic bases such as quinoline, pyridine, piperidine, isoquinoline, dialkyl amines such as diethyl amine, alkali metal alkoxides such as sodium or potassium methoxide or ethoxide, or similar well-known basic materials. The amount of catalyst is not critical and can be varied as desired. Ordinarily, a relatively small amount of basic catalyst such as about 0.001% to about 0.5% by weight is adequate.

While any of the esters hereinabove specified may be employed including ethyl, propyl, butyl, capryl, decyl, cyclohexyl, phenyl, lauryl, palmityl, it is preferred to employ the methyl α-cyano acetate for most purposes. However, when a waxy feel is desired, higher esters such as those of lauryl and palmityl may be desired.

The paper or paperboard substrate may be either neutral or alkaline in character since a content of acid inhibits the polymerization of the monomer vapor on the paper. It is unnecessary to apply a basic material to the paper unless it happens to be of acid character in the first place since it appears that the mere presence of a trace of water in a neutral paper sheet in air-dry condition is adequate to catalyze the polymerization of the monomeric vapor. Of course, the air-dry sheet may contain as much as 1% to 5% of moisture based on the total weight of the sheet.

In depolymerization of the polymer of the α-cyanoacrylate ester, it is merely necessary to heat such polymer in a suitable vessel, the temperature of depolymerization being somewhere above about 150° C. up to 250° C. depending upon the particular ester or mixture of esters. The heat required to raise the polymer to depolymerization temperature is in most cases adequate to volatilize the monomer to sufficient extent to accomplish the purposes of the present invention. A suitable confining channel for conveying the vapor to the paper is disposed above the depolymerization vessel. It may simply consist of a hopper-shaped conduit over the top of which the paper is held or, if it happens to be a continuous sheet, is passed. The time of contact required is relatively short such as from a few seconds to a minute or two. In most cases definite sizing effects and pronounced changes in the water-sensitivity of the paper sheets are obtained by the mere application of an amount of α-cyanoacrylate, which is hardly noticeable by a measurement of the increase in weight of the paper sheet. Amounts up to as high as 5% added weight on the weight of the paper may be employed for some purposes but, in general, an amount ranging from the order of about 0.01% to 0.20% will provide desirable improvement in one or more of the properties hereinabove mentioned.

The α-cyanoacrylate ester polymer formed in situ on the paper serves to size it and reduce its penetrability by water and its capacity for absorbing water although it appears that the deposit of the polymer is not a continuous film but rather takes the form of minute, discrete particles. In general, when small amounts of the monomer are applied as is most frequently preferred, the particles of polymer are so minute that they do not noticeably affect the optical properties of the sheet whether such sheet is coated or uncoated. The deposit of the polymer also improves the durability, the dimensional stability under moist conditions, and the water-repellency of the paper sheet. When applied to pigmented coatings on the paper or paperboard, the wet-rub resistance thereof is markedly improved especially when water-sensitive binders for such pigments are employed such as starch or poly(vinyl alcohol). One advantageous use of the present invention is to protect freshly printed, coated paperboard to prevent ink-smearing or offset.

The surprising fact is that the application of a preformed polymer directly to the sheet even in substantial amounts does not provide the type of improvement obtained by the in situ polymerization in accordance with the present invention.

The treatment is adapted to improve papers formed of all types of fiber stocks, especially those of poor quality, such as of oak, poplar, and yellow birch, and those of extremely short fiber length, as well as those of long fiber length and of good quality derivation, such as from spruce and hemlock. Any fibrous cellulosic material may be coated or impregnated by the process of the invention. A wide variety of fibrous cellulosic material used in the preparation of paper, board, moulded resin fillers and the like may be used, such as kraft pulp, rag pulp, soda, sulfate, ground-wood, sulfite pulp and alpha pulp. Similarly, other forms of fibrous cellulose such as cotton linters, and the like may be employed. These materials may be used alone or in admixture with fibers from other sources, such as jute, hemp, sisal, strings, chopped canvas, and other material, either cellulosic or non-cellulosic, that may improve the impact resistance, mechanical strength or other properties of the formed or moulded impregnated material.

The process of the present invention is adapted to produce papers and other fibrous products having increased water-resistance. The papers and felts obtained may be used for making paperboards, paper bags of the single wall or multi wall type, backings for flooring such as linoleum, roofing felts, waterproof or moisture-vapor-proof paper, paper or board containers or cartons for milk, butter, foods, etc., resin-impregnated laminating paper, abrasives composed of resin-impregnated paper coated with abrasive particles, moulded articles, premoulded articles, electrical insulators, filter paper, heat-insulating paper, or loose masses of unfelted and unmoulded impregnated cellulose stock used for air filters, dust filters, heat-insulation and the like.

In the claims, the term "paper product" is intended to include generically all types of papers as well as paperboards and other products made of paper which still retain paper-like characteristics at a surface of such products.

The following examples are illustrative of the present invention, and the parts and percentages are by weight unless otherwise indicated. The Cobb size test referred to therein is the T.A.P.P.I. Standard T44–m–45 test which indicates the capacity for absorption of water. It generally involves the holding of water in contact with a surface of the sheet within a stainless steel dam or ring for two minutes with a subsequent measurement of the increase in weight of the sheet as a result of absorption of water.

EXAMPLE 1

A paper made from a lightly-beaten fiber was treated with solutions of polymers of methyl α-cyanoacrylate (MCA) in acetone at concentrations of 0.5%, 1%, and 5%. Another piece of the same paper was treated by supporting it in the monomer vapor obtained in a vessel by heating a polymer of methyl α-cyanoacrylate (obtained from heating the monomer with formaldehyde at 50° to 80° C.) to a temperature of about 200° C. The time of exposure to the monomer vapor was about 60 seconds. The following table gives the results of measurements of the water absorbed. The methyl α-cyanoacrylate is represented hereinafter by the abbreviation MCA.

*Table I*

| Treatment With— | Cobb Size Test | | | |
|---|---|---|---|---|
| | Before Treatment, g. | After Treatment, g. | Water Absorbed, g. | Percent Absorbed |
| 1% poly(MCA) solution | 0.88 | 2.99 | 2.11 | 240 |
| 0.5% poly(MCA) solution | 0.88 | 2.89 | 2.03 | 232 |
| 5% poly(MCA) solution | 0.88 | 3.06 | 2.19 | 249 |
| MCA monomer (vapor) | 0.92 | 1.33 | 0.41 | 45 |
| None | 0.86 | 3.06 | 2.20 | 256 |

EXAMPLE 2

A coated paperboard printed with No. 5 IPI ink was exposed to the MCA monomer vapor obtained as in Example 1 for about 50 seconds. It was thereafter found to be completely resistant to smearing or offset onto paper or paperboard placed upon it. A similarly printed paper, not treated with MCA, smeared readily and showed serious offset under the same test conditions.

EXAMPLE 3

The water absorption improvement in various types of papers was improved by subjecting the papers to the MCA monomer vapor obtained as in Example 1 for a period of about 60 seconds. The basis weight of the various papers represents the pounds of a 500-sheet ream in which the sheets are of 24″ by 36″ in dimension.

*Table II*

| Type of Paper | Cobb Size Test | | |
|---|---|---|---|
| | Before MCA Treatment, percent | After MCA Treatment, percent | Percent Improvement |
| Bond (46 lbs.) | 19.2 | 13.8 | 28 |
| Bond (27 lbs.) | 24.3 | 13.9 | 43 |
| Saturating Paper (36 lbs.) | 153.0 | 31.8 | 79 |
| Postcard Stock (122 lbs.) | 8.5 | 5.1 | 40 |
| Water-leaf bleached kraft paper (17 lbs.) | 87.0 | 38.1 | 56 |

EXAMPLE 4

A 1% heptane solution of MCA monomer was obtained by passing the vapors obtained as in Example 1 through heptane until a 1% concentration was obtained. A coated paperboard prepared by application of an 80:20 clay:anatase $TiO_2$ coating, bound with 16% (on weight of fiber) poly(vinyl alcohol) (Du Pont Elvanol 70–05) had a wet-rub resistance of 22.2. This value is the G.E. Photovolt brightness of the white smear rubbed off the coating in a standard way onto black paper (a drop of water, 10 finger strokes). Following treatment with a dilute 1% heptane solution of MCA monomer in which the paperboard was dipped and quickly removed (about 1 second exposure), the wet-rub resistance had increased greatly. The Photovolt brightness was 13.5. The value for black paper (complete resistance) was 1.9.

A similar coating in which the filler was bound with 12% of an acrylic ester copolymer had a wet-rub resistance of 10.2. Following an exposure of about 1-second by dipping into a solution of MCA monomer this was raised to 3.0.

EXAMPLE 5

An 80:20 clay:anatase $TiO_2$ coating bound with about 20% starch to paperboard was exposed to MCA monomer vapor briefly (about one minute). The wet-rub resistance measured as described above was then 4.3. Untreated coated paperboard of the same composition showed a value of 17.2.

EXAMPLE 6

Various types of paper were subjected to the vapor of n-butyl α-cyanoacrylate (BCA) produced by heating the polymer of this ester in the manner used in Example 1 to produce MCA. Exposure to the BCA monomer lasted about 5 minutes. Results are given in Table III. The basis weights are for a 500-sheet ream (24″ x 36″ sheets).

*Table III*

| Type of Paper | Cobb Size Test | | |
|---|---|---|---|
| | Before BCA [a] Treatment, percent | After BCA [a] Treatment, percent | Percent Improvement |
| Unbleached kraft (49 lbs.) | 16.2 | 7.6 | 53 |
| Saturating Paper (35 lbs.) | 105 | 16.5 | 84 |
| Bond (46 lbs.) | 20.6 | 8.4 | 59 |
| Bleached Sulfite Coating Raw Stock (40 lbs.) | 16.6 | 15.8 | 5 |

[a] Water absorption as percent of dry weight.

EXAMPLE 7

In an experiment similar to Example 4, a 0.11% solution of ethyl α-cyanoacrylate (ECA) monomer in hexane was used to treat a paper coated with the following composition: the pigmented coating was 90:10 clay:anatase $TiO_2$ bound with 20% on pigments of 85:15 starch:butadiene-styrene polymer. The basis weight of the coated paper was 64.5 pounds/3000 sq. foot ream. Even at this low concentration, applied by dipping and evaporation of the hexane, the improvement in wet-rub resistance was substantial. (The calculated level of ECA pickup was 0.024% dry ECA on paper.) Wet rub resistance of the untreated paper was 27.0; that of the ECA treated paper was 18.0 (test method as given under Example 4).

EXAMPLE 8

A 7.7% (by weight) solution of ECA monomer in hexane was applied to various types of paper by dipping and evaporation of solvent with the results of Table IV.

Table IV

| Paper Type | Cobb Size Test | | | |
|---|---|---|---|---|
| | Calculated ECA Pickup, percent | Before ECA [a] Treatment, percent | After ECA [a] Treatment, percent | Percent Improvement |
| Unbleached Kraft (49 lbs.) | 1.8 | 16.2 | 11.0 | 32 |
| Saturating Paper (35 lbs.) | 8.2 | 105 | 13.3 | 87 |
| Bond (46 lbs.) | 4.4 | 20.6 | 10.0 | 51 |
| Bleached Sulfite Coating Raw Stock (40 lbs.) | 2.8 | 16.6 | 9.8 | 41 |

[a] Water absorption as percent of dry weight.

EXAMPLE 9

Two saturating papers (35 and 58 lbs. basis weight) were subjected to lower levels of ECA monomer by dipping in hexane solution and evaporation of solvent with the results of Table V.

Table V.—Effect of ECA treatment on saturating papers

35 LB. PAPER

| ECA Pickup, percent | Cobb Size Test | |
|---|---|---|
| | Percent Water Absorption | Percent Improvement |
| 0.000 | 105 | |
| 0.056 | 101 | 3.8 |
| 0.112 | 74 | 30 |

58 LB. PAPER

| | | |
|---|---|---|
| 0.000 | 205 | |
| 0.067 | 167 | 19 |
| 0.134 | 12 | 94 |

It is to be understood that changes and variations may be made without departing from the original spirit and scope of the invention as defined herein.

We claim:

1. A method which comprises subjecting a paper product in air-dry condition containing a small amount of moisture absorbed on its surface to vapor of an ester of α-cyanoacrylic acid having the formula $$CH_2=C(CN)COOR$$

where R is an alkyl group having 1 to 4 carbon atoms, for a period of at least about 15 seconds.

2. A method as defined in claim 1 in which the paper is subjected to the vapor of the ester for a period of about 1 to 2 minutes.

3. A method which comprises subjecting a mineral coated paper in air-dry condition containing a small amount of moisture absorbed on its surface to vapor of an ester of α-cyanoacrylic acid having the formula $$CH_2=C(CN)COOR$$

where R is an alkyl group having 1 to 4 carbon atoms, for a period of at least about 15 seconds.

4. A method which comprises subjecting a mineral-coated paper having pigmented printing matter on the mineral coating, in air-dry condition containing a small amount of moisture absorbed on its surface, to vapor of an ester of α-cyanoacrylic acid having the formula $$CH_2=C(CN)COOR$$

where R is an alkyl group having 1 to 4 carbon atoms, for a period of at least about 15 seconds.

5. A method which comprises subjecting a paper in air-dry condition containing a small amount of moisture absorbed on its surface to a vapor of methyl α-cyanoacrylate for a period of at least about 15 seconds.

6. A method as defined in claim 5, in which the paper is subjected to the vapor of the ester for a period of about 1 to 2 minutes.

7. A method which comprises subjecting a mineral-coated paper in air-dry condition containing a small amount of moisture absorbed on its surface to a vapor of methyl α-cyanoacrylate for a period of at least about 15 seconds.

8. A method which comprises subjecting a mineral-coated paper having pigmented printing matter on the mineral-coating, in air-dry condition containing a small amount of moisture absorbed on its surface, to vapor of methyl α-cyanoacrylate for a period of at least about 15 seconds.

9. A method which comprises subjecting a mineral-coated paper having pigmented printing matter on the mineral-coating, in air-dry condition containing a small amount of moisture absorbed on its surface, to vapor of ethyl α-cyanoacrylate for a period of at least about 15 seconds.

10. A method which comprises subjecting a mineral-coated paper having pigmented printing matter on the mineral-coating, in air-dry condition containing a small amount of moisture absorbed on its surface, to vapor of butyl α-cyanoacrylate for a period of at least about 15 seconds.

11. As an article of manufacture, a paper product carrying on the exposed surface thereof a completely polymerized solid deposit consisting essentially of at least one ester of α-cyanoacrylic acid having the formula $$CH_2=C(CN)COOR$$

where R is an alkyl group having 1 to 4 carbon atoms, the paper and the deposit being free of α-cyanoacrylate acid esters in unpolymerized form and the amount of the polymer being sufficient to reduce the absorption of water by the paper and being from about 0.01% to about 8% by weight, based on the initial weight of dry paper.

12. As an article of manufacture, a paper product having a pigmented coating carrying on the exposed surface thereof a completely polymerized solid deposit consisting essentially of at least one ester of α-cyanoacrylic acid having the formula $CH_2=C(CN)COOR$, where R is an alkyl group having 1 to 4 carbon atoms, the paper and the deposit being free of α-cyanoacrylic acid esters in unpolymerized form and the amount of polymer being sufficient to reduce the absorption of water by the paper and being from about 0.01% to about 8% by weight, based on the initial weight of dry paper.

13. As an article of manufacture, a paper product having printing matter superimposed over a mineral-coating on the paper, said article also carrying an outer protective completely polymerized solid deposit consisting essentially of at least one ester of α-cyanoacrylic acid having the formula $CH_2=C(CN)COOR$, where R is an alkyl group having 1 to 4 carbon atoms, the paper and the deposit being free of α-cyanoacrylic acid esters in unpolymerized form and the amount of polymer being sufficient to reduce the absorption of water by the paper and to substantially eliminate offset and being from about 0.01% to about 8% by weight, based on the initial weight of dry paper.

14. As an article of manufacture, a paper product carrying on the exposed surface thereof a completely polymerized solid deposit consisting essentially of methyl α- cyanoacrylate, the paper and the deposit being free of unpolymerized methyl α-cyanoacrylate, the amount of the deposit being from about 0.01% to about 8% by weight, based on the initial weight of dry paper.

15. As an article of manufacture, a paper product carrying on the exposed surface thereof a completely polymerized solid deposit consisting essentially of ethyl α-cyanoacrylate, the paper and the deposit being free of unpolymerized ethyl α-cyanoacrylate, the amount of the deposit being from about 0.01% to about 8% by weight, based on the initial weight of dry paper.

16. As an article of manufacture, a paper product carrying on the exposed surface thereof a completely polymerized solid deposit consisting essentially of butyl α-cyanoacrylate, the paper and the deposit being free of unpolymerized butyl α-cyanoacrylate, the amount of the deposit being from about 0.01% to about 8% by weight, based on the initial weight of dry paper.

17. As an article of manufacture, a paper having a pigmented coating carrying on the exposed surface thereof a completely polymerized solid deposit consisting essentially of methyl α-cyanoacrylate, the paper and the deposit being free of unpolymerized methyl α-cyanoacrylate, the amount of the deposit being from about 0.01% to about 8% by weight, based on the initial weight of dry paper.

18. As an article of manufacture, a paper having a pigmented coating carrying on the exposed surface thereof a completely polymerized solid deposit consisting essentially of ethyl α-cyanoacrylate, the paper and the deposit being free of unpolymerized ethyl α-cyanoacrylate, the amount of the deposit being from about 0.01% to about 8% by weight, based on the initial weight of dry paper.

19. As an article of manufacture, a paper having a pigmented coating carrying on the exposed surface thereof of a completely polymerized solid deposit consisting essentially of butyl α-cyanoacrylate, the paper and the deposit being free of unpolymerized butyl α-cyanoacrylate, the amount of the deposit being from about 0.01% to about 8% by weight, based on the initial weight of dry paper.

20. As an article of manufacture, a paper having printing matter superimposed over a pigmented coating on the paper, said article also carrying an outer protective completely polymerized solid deposit consisting essentially of methyl α-cyanoacrylate, the paper and the deposit being free of unpolymerized methyl α-cyanoacrylate, the amount of the deposit being from about 0.01% to about 8% by weight, based on the initial weight of dry paper.

References Cited in the file of this patent

UNITED STATES PATENTS

| | | |
|---|---|---|
| 2,346,858 | Mighton | Apr. 18, 1944 |
| 2,467,927 | Ardis | Apr. 19, 1949 |
| 2,661,309 | Azorlosa | Dec. 1, 1953 |
| 2,776,232 | Shearer | Jan. 1, 1957 |
| 2,776,946 | Lylton | Jan. 8, 1957 |
| 2,790,735 | McLaughlin | Apr. 30, 1957 |
| 2,824,778 | Robbort | Feb. 25, 1958 |
| 2,930,106 | Wrotnowski | Mar. 29, 1960 |